United States Patent [19]

Nelson et al.

[11] Patent Number: 5,273,340
[45] Date of Patent: Dec. 28, 1993

[54] CAB ASSEMBLY

[75] Inventors: Peter M. Nelson, Plano; Craig B. Kelley, Dunlap, both of Ill.

[73] Assignee: Caterpillar Inc., Peoria, Ill.

[21] Appl. No.: 962,556

[22] Filed: Oct. 19, 1992

[51] Int. Cl.$^5$ .............................................. B62D 23/00
[52] U.S. Cl. ...................................... 296/190; 296/204; 296/901
[58] Field of Search .......................... 296/190, 204, 901

[56] References Cited

U.S. PATENT DOCUMENTS

| | | | |
|---|---|---|---|
| 4,695,342 | 9/1987 | Belleau et al. | 296/901 X |
| 5,129,700 | 7/1992 | Trevisan et al. | 296/204 |
| 5,150,942 | 9/1992 | Fujan et al. | 296/190 |

Primary Examiner—Robert R. Song
Attorney, Agent, or Firm—William C. Perry

[57] ABSTRACT

Cab assemblies utilized on modern day construction vehicles normally include a myriad of sheet metal components that are welded or bolted together to provide the structural support and the mountings for the various components that comprise a cab. The number of components and the time required to fabricate and weld, or otherwise assemble them, is often quite extensive. The more piece-parts that are required in the configuration of a cab, the more time is required to complete the assembly process. This translates directly into the cost of a cab assembly. The present invention provides a cab assembly that utilizes a non-metallic floor member as an integral part of its structure. The floor member not only incorporates the hardware required for mounting various components housed within the cab assembly, it also provides support for the cab's windshield assembly. The windshield assembly is mounted between the floor member and a structural member positioned in the vicinity of the cab's roof. Both structural members are adapted to provide surfaces to which the windshield assembly may be bonded. The combined result of these features provides a cab assembly that has a greatly reduced number of components and is therefore extremely economical and efficient in its design.

13 Claims, 4 Drawing Sheets

CAB ASSEMBLY

TECHNICAL FIELD

This invention relates to the construction of a cab assembly and more particularly to the utilization of a non-metallic floor member as a structural component thereof.

BACKGROUND ART

In prior cab designs, the use of non-metallic material in the region of the floor has been limited in its usage. In many instances, a rubber matting has been incorporated in the sheet metal configuration of the floor assembly to both reduce noise and dampen vibration and sound. In other designs, a non-metallic floor structure provides a relatively substantial base for the cab assembly; however, it is intended to rest upon the structural members of the cab and does little more than support the weight of the operator.

The present invention is directed to overcoming one or more of the problems as set forth above.

DISCLOSURE OF THE INVENTION

In one aspect of the present invention, a cab assembly is provided that includes a frame assembly that has a lower portion and an upper portion. The lower and upper portions are spaced from one another and are interconnected by a plurality of generally vertically oriented support members. Disposed within the cab assembly are an operator's seat and a plurality of controls with which to operate a vehicle to which the cab assembly is attached. A non-metallic floor member is provided that is secured to the lower frame portion in load bearing relation thereto and is adapted for integrally mounting and supporting the seat assembly and vehicle controls thereon.

In another aspect of the present invention, a cab assembly is provided that forms an enclosure for a seat assembly and plurality of vehicle controls. The cab assembly includes a rollover protection structure that has a generally rectangular lower portion and a generally rectangular upper portion. A plurality of vertically oriented posts interconnect the upper and lower portions of the rollover protection structure at the corners thereof. A plate member is mounted on the upper portion in overlying relationship therewith. A non-metallic floor member is included that has a projection formed on an end portion thereof and a support lip is further defined on the projection. The non-metallic floor member is sufficient for placement upon the lower portion of the rollover protection structure in load bearing relationship therewith to mount and support the seat and vehicle controls. The floor member is positioned with the projection extending forwardly of the rollover protection structure. A windshield assembly is included that has a lower end portion that is positioned for engagement with said support lip and is secured to the projection of the non-metallic floor plate and an upper portion that is secured to the plate member that overlies the upper portion of the rollover protection structure.

With the cab assembly as set forth above, the non-metallic floor plate not only provides a barrier for vibration and noise, it also becomes an integral structural member of the cab assembly. It provides support and bonding surfaces for the windshield assembly along the support lip. Likewise, the windshield assembly is bonded directly to the plate member, or falling object protection structure, to secure the upper extremity of the windshield assembly. Being mounted in this fashion eliminates the need for costly sheet metal supports that have formerly been required to secure the windshield assembly of a cab. In addition, since the floor member is non-metallic, it may be formed by molding or like process to integrally provide a support for the seat assembly as well as a cavity for the heating, ventilating and air conditioning unit. As a result, the design of the cab is far less complex than previous cabs requiring fewer components. This not only reduces the cost of the number of parts, but also reduces the time and the cost involved with the assembly of the cab.

BEST MODE FOR CARRYING OUT THE INVENTION

Figure 1:
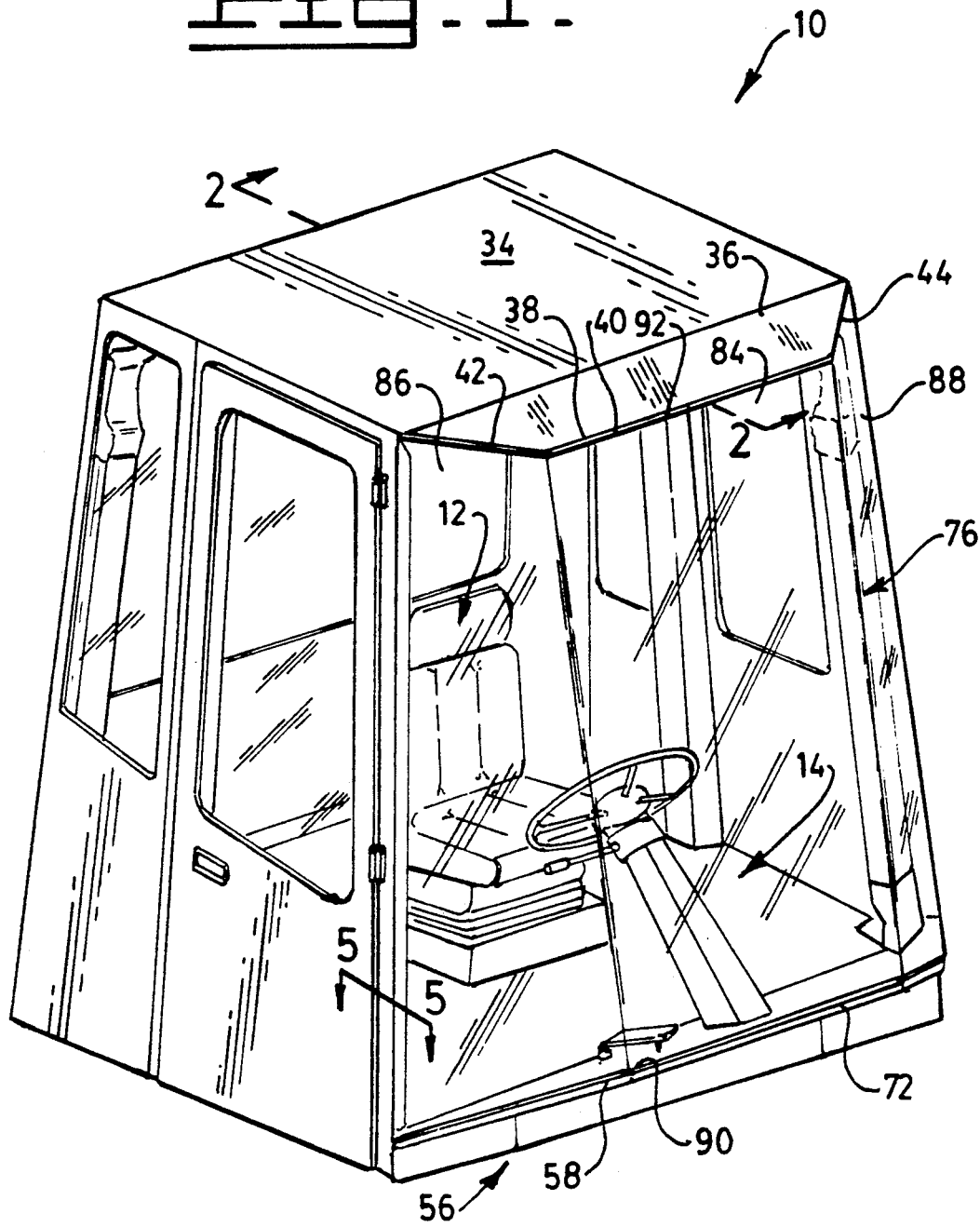
FIG. 1 is a diagrammatic, perspective view of a cab assembly that embodies the principles of the present invention.
Figure 2:
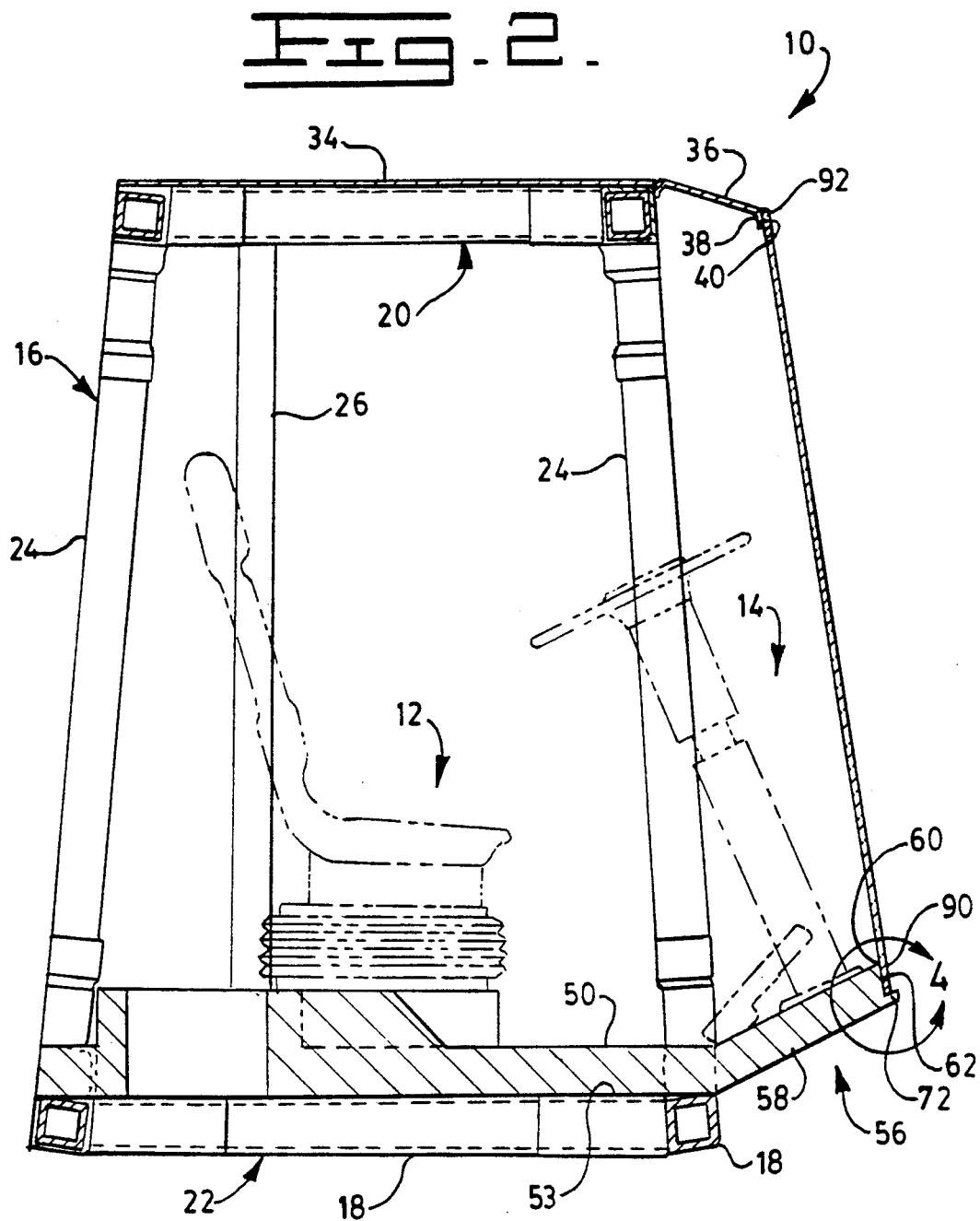
FIG. 2 is a diagrammatic, cross-sectional view taken along lines 2—2 as shown in FIG. 1.

Turning now to the drawings, it can be seen that a cab assembly 10 is disclosed that provides an enclosure from which a vehicle (not shown) may be operated. The enclosure includes a seat assembly 12 that positions an operator in close proximity to vehicle controls 14 which he selectively uses to manipulate the vehicle. The cab assembly is built around a framework known commonly as a rollover protection structure or ROPS 16. The ROPS includes a plurality of tubular members 18 that are joined together as by welding or the like to form a skeleton-like frame structure. The ROPS is formed by an upper and lower frame portion 20 and 22, each of which is generally rectangular in configuration and is positioned in generally spaced, horizontal relation to one another. The two frame portions 20 and 22 are interconnected by a plurality of vertically oriented support members or posts 24 that extend between opposing corners of the respective frame portions. Another post 26 is positioned between the respective frame portions 20 and 22 on each side of the cab assembly 10. The posts 24 provide structure t which various doors and windows of the cab assembly may be mounted. A pair of generally vertically extending angled members 28 (FIG. 5) are secured to a forward face of the forwardmost post members 2 defined by the ROPS. The angled members have a first leg portion 30 that is secured to the post by tack welding or the like and a second leg portion 32 that extends inwardly at a preselected angle.

A plate member 34 is secured to the upper portion 20 of the ROPS 16 in overlying relationship thereto and serves as a means to protect the operator and controls enclosed within the cab assembly from falling objects. This structure is commonly known as a falling object protection structure, or FOPS. The plate member 34 is also generally rectangular in configuration with the exception of a forwardly directed portion 36 that extends just beyond the upper portion 20 of the ROPS.

Figure 3:
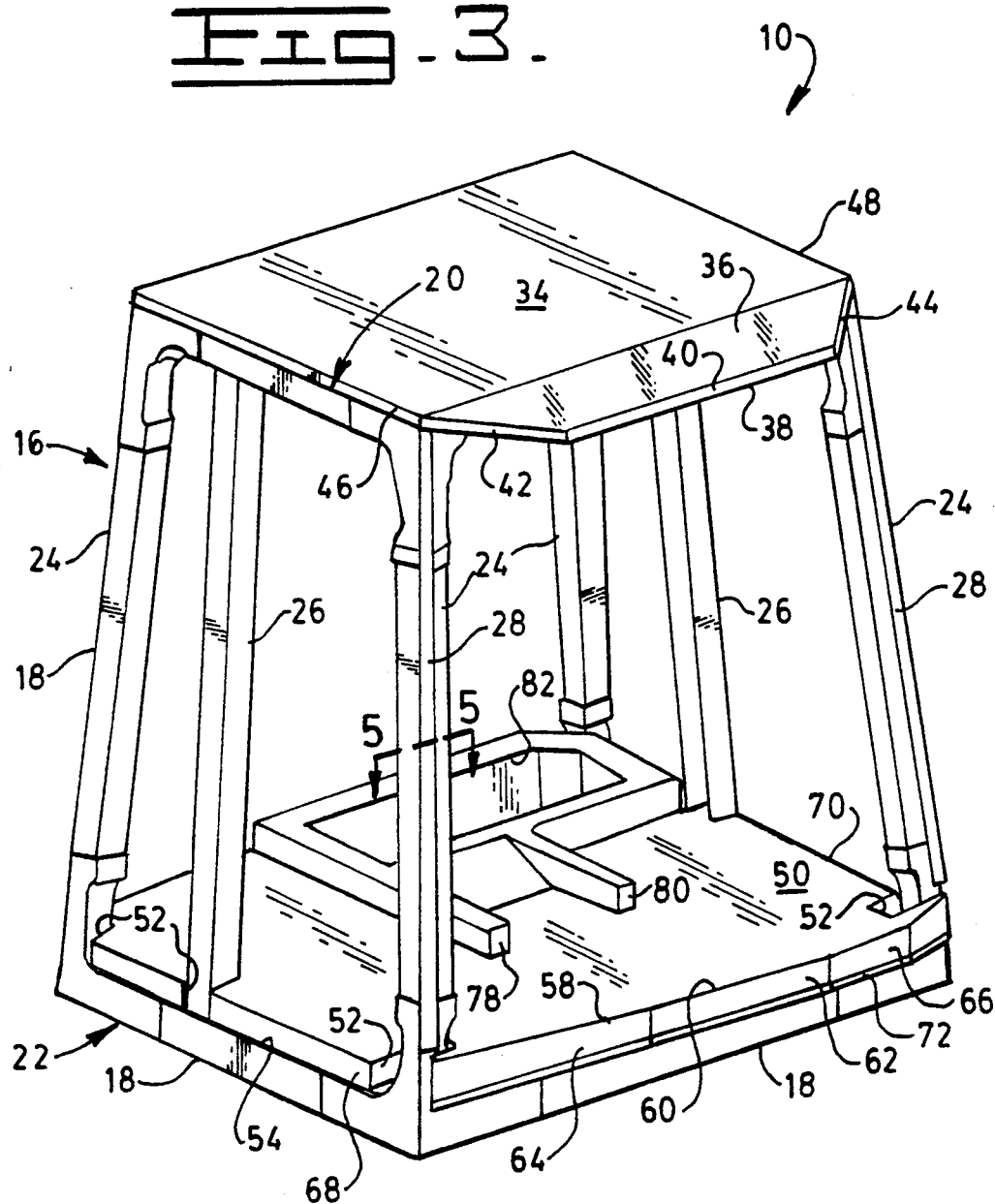
FIG. 3 is a diagrammatic perspective view, similar to FIG. 1, with portions of the cab structure removed to more clearly illustrate the interior.
Figure 4:
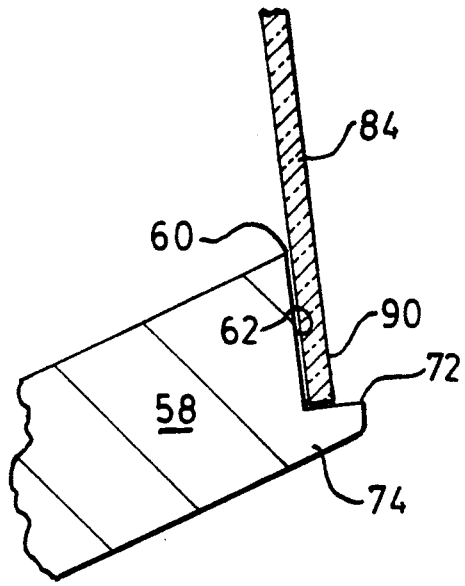
FIG. 4 is an enlarged cross-sectional view of the encircled area indicated in FIG. 2.

The forward portion 36 extends downwardly from the upper portion 20 at a slight angle. As can best be seen in FIG. 3, the forward portion 36 terminates at a generally vertically disposed edge 38 that defines a forwardly facing surface 40 that extends generally parallel to the front of the ROPS. A pair of generally vertically oriented surfaces 42 and 44 are defined by the edge 38 and taper rearwardly from centrally disposed surface 40 to respective side portions 46 and 48 of the FOPS. The three surfaces 40, 42 and 44 combine to form a generally trapezoidal configuration across the front of the cab assembly 10.

A floor member 50, formed or molded of non-metallic material such as fiber reenforced polyurethane, is provided for placement over the lower frame portion 22 of the ROPS. The floor member 50 defines indentations or relieved portions 52 that are of sufficient size and shape to receive the vertically extending post members 24 and 26 so that the floor member may rest in full contact with an upper surface 54 (FIG. 3) defined by the lower portion of the ROPS. A bonding agent of any suitable type having a urethane base is disposed between the floor member 50 and the upper surface 54 to secure the two components together. The floor member has a forward end portion 56 that defines a projection 58 that extends slightly beyond the forward most edge of the ROPS and is angled in a slightly upward direction. With the exception of the upward angle, the projection 58 is very similar in configuration to that of the forward portion 36 of the plate member 34. The floor member terminates on its forward end portion at an edge 60 that extends across the front of the cab assembly 10. The edge 60 defines a centrally disposed, forwardly facing surface 62 in a fashion similar to that of the forward portion 36 of the plate member 34. A pair of generally vertical surfaces 64 and 66 taper rearwardly from the centrally disposed surface 62 to the respective side portions 68 and 70 of the floor member 50 to take on a generally trapezoidal configuration. A forwardly directed lip portion 72 extends outwardly from a lower edge 74 of the projection and parallels the respective angled surfaces 60, 62 and 64. The lip portion 72 serves as a mounting support for a windshield assembly 76 as will be described in greater detail hereinafter.

A pair of upraised rail members 78 and 80 are defined by the floor member 50 at a generally central region thereof. The rail members 78 and 80 serve as a mounting base for the seat assembly 12. Each rail member may be provided with threaded inserts or similar fastening means (not shown) with which mounting bolts may be engaged to secure the seat assembly to the floor member.

A cavity 82 is positioned immediately behind the upraised rail members 78 and 80. The cavity is of sufficient size and depth to accommodate the various components that comprise the heating, ventilating and air conditioning unit (not shown) that is commonly referred to as a HVAC. In a manner similar to that of the rail members, the cavity may be provided with threaded inserts or the like to accommodate mounting of the various components.

The windshield assembly 76 includes three angled sections or panels 84, 86 and 88 of suitable transparent material. The lower portion 90 of the windshield assembly 76 is engageable with the lip 72 of the projection 58 to rest thereupon for support. The angled sections 84, 86 and 88 of the windshield assembly correspond to the trapezoidal configuration of the projection 58 and are positioned for contact with the respective surfaces 62, 64 and 66. Similarly, an upper portion 92 of the windshield assembly 76 bears against the surfaces 40, 42 and 44 formed by the forward edge 38 of the plate member 34. Any of the commonly known bonding agents currently utilized in the automotive industry for securing windshields may be applied between the windshield assembly and the respective surfaces 40, 42 and 44 of the plate member and surfaces 62, 64 and 66 of the floor member to permanently attach the windshield assembly to the cab assembly. Being so configured, the windshield assembly provides virtually an unobstructed view between the upper and lower portions 20 and 22 of the cab in a forward direction.

INDUSTRIAL APPLICABILITY

During the assembly of a cab 10, the ROPS 16 is constructed first by fabricating the upper and lower frame portions 20 and 2 and interconnecting them with the vertical posts 24 and 26. The various components are secured to each other by welding. The plate member 34 is then positioned on the upper portion 20 of the ROPS and is also welded in place.

The floor member 50, which is formed in one piece as previously stated, is positioned to rest upon the upper surface 54 of the lower portion 22 of the ROPS. The relieved portions 52 are positioned to receive the respective post members 24 and 26. Being so mounted, the outer periphery of the floor member 50 is positioned to be generally flush with that of the lower portion of the ROPS so that it rests in full contact with the upper surface 54. In this manner, the upper surface provides sufficient contact area on which to apply a bonding agent to secure the floor member firmly in place. Once the floor member is firmly in position, the seat assembly 12, the HVAC components and the vehicle controls may be assembled in their normal sequence.

Figure 5:
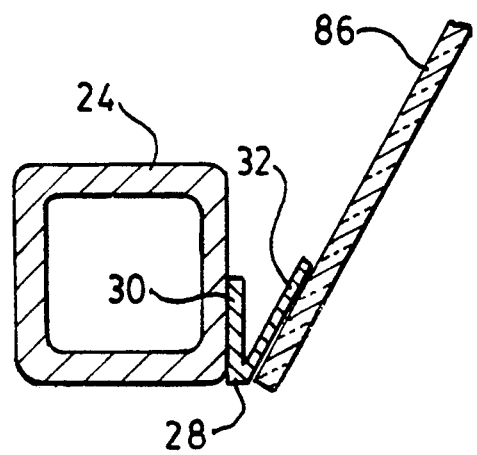
FIG. 5 is a partial cross-sectional view taken along lines 5—5 of FIG. 1.

When mounting the windshield assembly 76, the lower portion 90 thereof is positioned to rest on the support lip 72 of the projection 58 defined by the floor member 50. Due to the orientation of the forward portion 56 of the floor member 50, the surfaces 62, 64 and 66 defined thereby match the configuration of the respective panels of the windshield assembly. Likewise, the surfaces 40, 42 and 44 defined by plate member 34 also match the configuration of the respective panels 84, 86 and 88 of the windshield assembly. The second leg portion 32 defined by the angled members 28 that are attached to the ROPS posts 24 define an angle that substantially matches that of the side panels of the windshield assembly. The second leg portion 32 in conjunction with the surfaces defined by the forward portions of the respective plate and floor members provide a surface to which a bonding agent may be applied to secure the windshield in place (FIG. 5). Therefore, it can be seen that the entire periphery of the windshield assembly is provided with a surface to which it may be bonded for permanent installation.

The remaining components of the cab assembly 10 such as the door, the sheet metal coverings and the other window assembly are secured in place by conventional mounting apparatus to complete the assembly process.

Thus, it can be seen from the foregoing description that a cab assembly 10 is provided that utilizes a non-metallic floor member 50 as an integral portion of its structural composition. Not only does the floor member support the weight of the operator in a normal fashion, it also provides structural reenforcement to the ROPS 16. In addition, since the floor member is a one piece unit, threaded inserts and other appropriate mounting hardware may be integrally incorporated into the construction of the floor member. This translates into a substantial economic advantage in that the mounting hardware that is normally required to mount the various components within the cab assembly, as well as the time required to fabricate and install these components, is totally alleviated.

In a similar vein, the mounting of the windshield 76 provides yet another economic advantage. The windshield is totally supported by the floor member and mounted through bonding around its entire periphery. Only the two angled members 28, positioned on the posts 24 of the ROPS, are added specifically to provide a mounting surface for the lateral edges of the windshield. All other mounting surfaces are formed by adjacent structural members. In addition to the enhanced visibility provided by a windshield that extends from floor to roof, the same economic advantages previously set forth with respect to the non-metallic floor member and the components mounted thereon, may also be applied to the mounting of the windshield assembly. The resultant combination of these features provides a cab assembly that has an extremely efficient design, yet that is extremely cost effective.

Other aspects, objects and advantages of this invention can be obtained from a study of the drawings, the disclosure and the appended claims.

We claim:

1. A cab assembly, comprising:
   a frame assembly having a lower portion and an upper portion, said lower and upper portions being spaced from one another and interconnected by a plurality of generally vertically oriented support members;
   a seat assembly;
   a plurality of vehicle controls;
   a non-metallic floor member secured to the lower frame portion in load bearing relation thereto and being adapted for integrally mounting and supporting the seat assembly and vehicle controls thereon; and
   a mounting support for a windshield assembly, said mounting support being integrally formed by the floor member.

2. A cab assembly as set forth in claim 1 wherein the mounting support further defines a projection having a supporting lip defined along an edge portion thereof, said projection extending laterally and slightly upwardly from a forward end portion of said floor member.

3. A cab assembly as set forth in claim 2 wherein the windshield assembly includes a lower end portion engaged with the supporting lip defined by the projection of the floor member and an upper portion that is engaged with the upper portion of the frame assembly.

4. A cab assembly as set forth in claim 1 wherein the upper and lower frame portions include a plurality of generally horizontally extending tubular members that are secured together in a generally rectangular configuration.

5. A cab assembly as set forth in claim 4 wherein the floor member rests upon and is bonded to the lower portion of the frame assembly and is sufficient for directly accommodating the loads that are transmitted thereto through the seat assembly and vehicle controls.

6. A cab assembly as set forth in claim 3 wherein a plate member is attached to the upper portion of the frame assembly in overlying relationship thereto and engages the upper portion of the windshield assembly to secure it to the upper portion of the frame assembly.

7. A cab assembly as set forth in claim 6 wherein the projection of the floor member and the plate member define an edge portion having three angled surfaces to which the windshield assembly is bonded to form a forwardly directed, angled windshield assembly which provides a substantially unobstructed view between the upper and lower frame portions.

8. A cab assembly forming an enclosure for a seat assembly and a plurality of vehicle controls, comprising:
   a roll over protection structure having a generally rectangular lower portion and a generally rectangular upper portion and a plurality of vertically oriented posts interconnecting the upper and lower portions of the roll over protection structure at the corners thereof;
   a plate member mounted on the upper portion in overlying relationship therewith;
   a non-metallic floor member having a projection formed on an end portion thereof and a support lip defined on said projection, said non-metallic floor member being of a construction sufficient for placement upon the lower portion of the rollover protection structure in load carrying relationship therewith to mount and support said seat and vehicle controls, said floor member being positioned with said projection extending forwardly of the rollover protection structure; and
   a windshield assembly having a lower end portion that is positioned for engagement with the support lip and is secured to the projection of the non-metallic floor member and an upper portion that is secured to the plate member that overlies the upper portion of the rollover protection structure.

9. A cab assembly as set forth in claim 8 wherein the projection of the floor member and a forward portion of the plate member each define a forwardly directed edge portion having three angled surfaces, and the windshield assembly extending therebetween defines three angled panels of transparent material that have a configuration substantially the same as the respective surfaces defined by the floor member and the plate member to which the windshield assembly may be bonded.

10. A cab assembly as set forth in claim 9 wherein a pair of angled members are attached to each of a respective forward pair of said posts, each angled member having a first leg portion attached to the respective posts and a second leg portion having a preselected, inwardly directed angle, said second leg portion forming a surface to which opposing sides of said windshield assembly may be bonded, said angled members and said angled surfaces defined by the respective plate member and floor member combining to permanently secure the windshield assembly to the cab assembly in a manner which provides substantially unobstructed visibility, from within the cab assembly, between the floor member and the plate member in a forward direction.

11. A cab assembly as set forth in claim 8 wherein the non-metallic floor member is formed of fiber reenforced polyurethane and has a means for mounting the seat assembly and vehicle controls are integrally formed therein.

12. A cab assembly as set forth in claim 8 wherein a cavity is integrally formed in the non-metallic floor member and is positioned behind the seat assembly and is sufficient for receiving heating and air conditioning components.

13. A cab assembly as set forth in claim 8 wherein the non-metallic floor member defines relieved portions that are sufficiently configured to receive the vertically oriented posts that extend between the upper and lower portions of the rollover protection structure.

* * * * *